United States Patent
Meier et al.

(10) Patent No.: US 8,092,094 B2
(45) Date of Patent: Jan. 10, 2012

(54) ROLLING BEARING SLEWING CONNECTIONS

(75) Inventors: Peter Meier, Oberreichenbach (DE); Frank Neubert, Schonungen (DE); Jürgen Stülzle, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 572 days.

(21) Appl. No.: 12/226,812

(22) PCT Filed: Apr. 4, 2007

(86) PCT No.: PCT/EP2007/053318
§ 371 (c)(1),
(2), (4) Date: Nov. 10, 2008

(87) PCT Pub. No.: WO2007/125007
PCT Pub. Date: Nov. 8, 2007

(65) Prior Publication Data
US 2009/0103845 A1    Apr. 23, 2009

(30) Foreign Application Priority Data
Apr. 29, 2006  (DE) .......... 10 2006 019 982

(51) Int. Cl.
*F16C 33/58* (2006.01)
*F16C 33/36* (2006.01)
*F16C 33/62* (2006.01)

(52) U.S. Cl. ........ 384/513; 384/516; 384/611; 384/615; 384/622

(58) Field of Classification Search .......... 384/491–492, 384/494, 510, 512–513, 515–516, 548, 564, 384/625, 907.1, 611, 622, 615
See application file for complete search history.

(56) References Cited

U.S. PATENT DOCUMENTS

| | | | | |
|---|---|---|---|---|
| 3,097,898 A | * | 7/1963 | Ferdig ............. | 384/547 |
| 3,504,955 A | * | 4/1970 | Bailey ............. | 384/535 |
| 3,604,545 A | * | 9/1971 | Bourgeois ......... | 384/536 |
| 3,940,200 A | * | 2/1976 | Schreffler ........ | 439/17 |
| 4,362,344 A | * | 12/1982 | Lederman .......... | 384/482 |
| 4,530,609 A | * | 7/1985 | Jasperse et al. ... | 384/482 |
| 5,211,273 A | * | 5/1993 | Castens ........... | 192/45 |
| 5,741,762 A | * | 4/1998 | Kahlman .......... | 384/907.1 |
| 6,269,711 B1 | * | 8/2001 | Tejima ............ | 384/512 |
| 6,315,455 B1 | * | 11/2001 | Tanaka et al. .... | 384/625 |
| 6,659,649 B2 | * | 12/2003 | Ishiguro et al. .. | 384/486 |
| 6,766,975 B2 | * | 7/2004 | Yamaguchi ........ | 242/246 |
| 6,896,416 B2 | * | 5/2005 | Matsuzaki ........ | 384/625 |

FOREIGN PATENT DOCUMENTS

| | | |
|---|---|---|
| DE | 1228465 | 11/1966 |
| DE | 2348986 A1 | 10/1974 |
| DE | 102004035387 A1 | 3/2006 |
| EP | 0303758 A2 * | 2/1989 |
| JP | 57040117 A * | 3/1982 |
| JP | 09-209102 A * | 8/1997 |
| WO | WO 02077469 A | 10/2002 |

* cited by examiner

*Primary Examiner* — Marcus Charles
(74) *Attorney, Agent, or Firm* — Charles A. Muserlian

(57) ABSTRACT

A rolling bearing slewing connection comprising two race rings arranged concentrically in each other, between which race rings rolling elements roll on associated raceways, one of the race rings having a flexible configuration wherein, as viewed in a longitudinal section, the flexible race ring has a weakened configuration, so that a radial, elastic deformation that is so large that the rolling elements are pre-stressed in the loaded state in the entire peripheral region is possible.

7 Claims, 3 Drawing Sheets

ROLLING BEARING SLEWING CONNECTIONS

This application is a 371 of PCT/EP2007/053318 filed Apr. 4, 2007.

FIELD OF THE INVENTION

The invention concerns a rolling bearing stewing connection comprising two race rings arranged concentrically in each other, between which race rings rolling elements roll on associated raceways, at least one of the race rings having a flexible configuration.

BACKGROUND OF THE INVENTION

Rolling bearing slewing connections have been known for a long time. As elucidated in the text book "Die Wälzlagerpraxis" (Rolling bearing practice) published in 1995 by the united "Fachverlage GmbH", such rolling bearing slewing connections are used as pivot bearings for the support of dredgers, excavators, cranes or in vehicle engineering for articulated buses or streetcars, i.e. in fields of use in which high loads occur in a restricted construction space and which demand a high degree of operational safety. The main fields of use of such slewing connections are therefore characterized by a low peripheral speed partially, however, at very high tilting torques and high axial and radial forces. Such slewing connections are partly only very slightly pre-stressed and are usually filled with rolling elements with the help of a filling stopper. Rolling bearing slewing connections of this type are disclosed, for instance, in DE 37 25 972 A1, DE 195 10 182 A1, DE 196 34 877 A1 and from DE 197 28 606 A1.

Rolling bearing slewing connections are also used in the field of medical technology, for example in computer tomography devices. Rolling bearing stewing connections are further to be found in similar X-ray devices for the control of baggage in the security areas e.g. of airports. In contrast to the aforesaid uses, the field of medicine and also baggage scanners make completely different demands of slewing connections:

Compared to the bearing diameter, the loads to be supported are very low, i.e. low tilting moments, low radial and axial forces.

The peripheral speeds are very high, for example, speeds of rotation of 150 rpm for a rolling bearing pitch circle of 1 meter are by no means seldom.

The requirement concerning low noise generation is likewise very high. Thus, it is quite normal that a measurable running noise, measured as airborne noise at a distance of 1 meter to the rolling bearing axis, is not permitted to exceed a maximum total sound pressure level of 65 dB (A).

In addition, a long operating life is demanded up to the fatigue endurance limit.

It is quite clear from the above that hitherto known rolling bearing slewing connections cannot meet these enhanced requirements in the medical and the security sectors. This particularly concerns the required smoothness of running at high peripheral speeds and low initial torque.

It is true in this connection, that DE-AS 1 288 465 discloses to a person skilled in the art a rolling bearing slewing connection for a dredger or a crane but, in the best case, this connection is only indirectly related to the present claimed solution. In this prior art, one of the race rings is connected to an upper carriage supporting the shovel and the other race ring is connected to the lower carriage. When the upper carriage slews with a full shovel, the load applied to each ball is multiplied. During digging work, such high loads occur, that the upper carriage tilts, and the tilt loads are then only counterbalanced on the jib side and on the counterweight side of the raceways and can be transmitted to a plurality of balls only through the deformation of balls and raceways. However, it is not easy to determine this deformation mathematically and it also does not always remain in the elastic range. This leads, if not to a destruction of the raceway, at least to an augmentation of lash between balls and raceway and to a lift-off of the raceways, so that the individual loads on each ball increase even more. At this point, destruction is inevitable, so that the durability of the bearing is limited. According to the invention, the race ring associated and fixed to the upper carriage is fixed in such a manner that the fixing permits a radial deformation of the race ring in its entirety. This is achieved on the one hand by the fact that the upper carriage comprises centering battens for the race ring that is associated to the upper carriage, these battens are situated on the inner and the outer side of this raceway and their arrangement permits the deformation of the race ring but limits the extent of this deformation. A second possibility, on the other hand, is for the race ring associated to the upper carriage to comprise horizontal, groove-like milled recesses that penetrate deeper into the race ring than the ball raceway.

Irrespective of the fact that this radial deformation of the race ring associated to the upper carriage is effected with a view to a uniform distribution of load, that is to say, for fully different reasons compared to the invention, the implementation of the groove-like milled recesses is complex and, as a result, expensive. Besides this, high stress peaks are formed at the groove bottom, so that a danger of rupture of the race ring is given. In addition, milled recesses do not result in a uniform bending torque pattern because these recesses do not form a circumferential groove but only partial incisions of 90° or more.

SUMMARY OF THE INVENTION

Taking the drawbacks of the prior art as a starting point, it is therefore an object of the present invention to provide a rolling bearing slewing connection that meets the aforesaid requirements.

This and other objects and advantages of the present invention will become more obvious from the detailed description of the invention.

The invention achieves the above objects in a generic rolling bearing slewing connection by the fact that, as viewed in a longitudinal section, the one-piece flexible race ring has a weakened configuration, so that a radial, elastic deformation that is so large that the rolling elements are pre-stressed in the loaded state in the entire peripheral region is possible.

In contrast to rigid bearing rings in which high biasing forces lead to high Hertzian stresses that reduce the operating life of the bearing, the weakening of the race ring in the novel manner of the invention imparts to the race ring a resiliency that takes up a part of the pre-stress. In this way, not only is the running noise at high speeds of rotation significantly reduced but a long operating life of the rolling bearing slewing connection is also made possible.

According to another feature of the invention, advantageously, said race ring comprises a first, base part that is connected to an adjoining structure and a second part that branches off the base part in axial direction and carries the raceway, the radial thickness of the base part being larger than the radial thickness of the part carrying the raceway. According to further features of the invention, as viewed in axial direction, the part carrying the raceway may have a constant radial thickness, or a radial thickness that diminishes in direction of the raceway.

For enabling the setting of different elastic deformations and the required different biasing stresses in the case of rolling bearing slewing connections having dimensions of different orders of magnitude, the invention advantageously proposes specific size ratios for the radial thickness B1 of the part carrying the raceway in a region adjoining the base part and its radial thickness B2 in a region of the raceway.

Through a ratio B1:B2≧1.5:1, a uniform distribution of stress within the part carrying the raceway is assured. The invention realizes an approximately uniform spring characteristic, so that the part of the race ring carrying the raceway is elastically deformed over its entire axial length and not only in the region where it branches off the base part. The magnitude of the biasing force applied is also adjusted through the ratio B1:H≦1:2, wherein H is the axial length of the part carrying the raceway and the biasing force decreases with an increasing axial length H.

A further possibility of influencing the biasing force of the resilient race ring is its hardening treatment. The geometric ratios remaining the same, a hardened race ring will have a larger elastic range than an unhardened race ring. It is quite obvious that a longer operating life, up to the fatigue endurance limit, is achieved by an improvement of the hardness values of both the race rings.

According to still another feature of the invention, the rolling bearing stewing connection is configured as a four-point ball bearing. Four-point ball bearings possess on each of the inner and the outer race ring, two circular arc-shaped raceways whose centers of curvature are offset to each other, so that, under radial load, the balls are in contact with the race rings at four points. The advantage of a four-point bearing resides in the fact that, due to pressure angles acting on both sides, such a bearing can also support axial forces in both directions as well as tilting moments.

In a further development of the invention, the ratio of a pitch circle diameter to a diameter of each individual rolling element is larger than 30:1. By pitch circle is to be understood the imaginary circle that is arranged concentric to the axis of rotation of the stewing connection and intersects the central axes of the rolling elements, which central axes are in parallel orientation to the axis of rotation. In cylindrical rolling elements, the central axes are the axes of rotation or of symmetry and in balls, they are imaginary axes that extend through the ball centers and are parallel to the axis of rotation of the slewing connection. A bearing of this type is known to a person skilled in the art as a so-called thin ring bearing and, due to its inherent and dimensional stability, facilitates installation in surrounding structures e.g. in the given connecting structure.

Finally, according to a last feature of the invention, the rolling elements are made of a ceramic material. Particularly suitable for this purpose is hot-pressed silicon nitride that has lower dry friction coefficients compared to metallic materials, so that the slewing connection can also be operated without lubricant. In addition, rolling elements made of a ceramic material cause a lower centrifugal force load. A further advantage is that ceramic rolling elements free the raceways of smaller impurities because they pulverize them through their hardness. Tests have also shown that ceramic rolling elements have a positive effect on the running smoothness of a stewing connection. Further elucidations at this point can be dispensed with because ceramic bearings are already known, per se. Details can be taken from the following prior art documents cited here by way of example: DE 25 11 120 A1, DE 39 26 577 A1, DE 73 17 997 U1, DE 196 12 571 A1, DE 197 29 450 A1, EP 0 258 845 A2, EP 0 320 951 A1, EP 0 446 723 B1.

BRIEF DESCRIPTION OF THE DRAWINGS

Further features of the invention result from the following description and drawings which show an example of embodiment of the invention in a simplified representation.

DETAILED DESCRIPTION OF THE DRAWINGS

Figure 1:
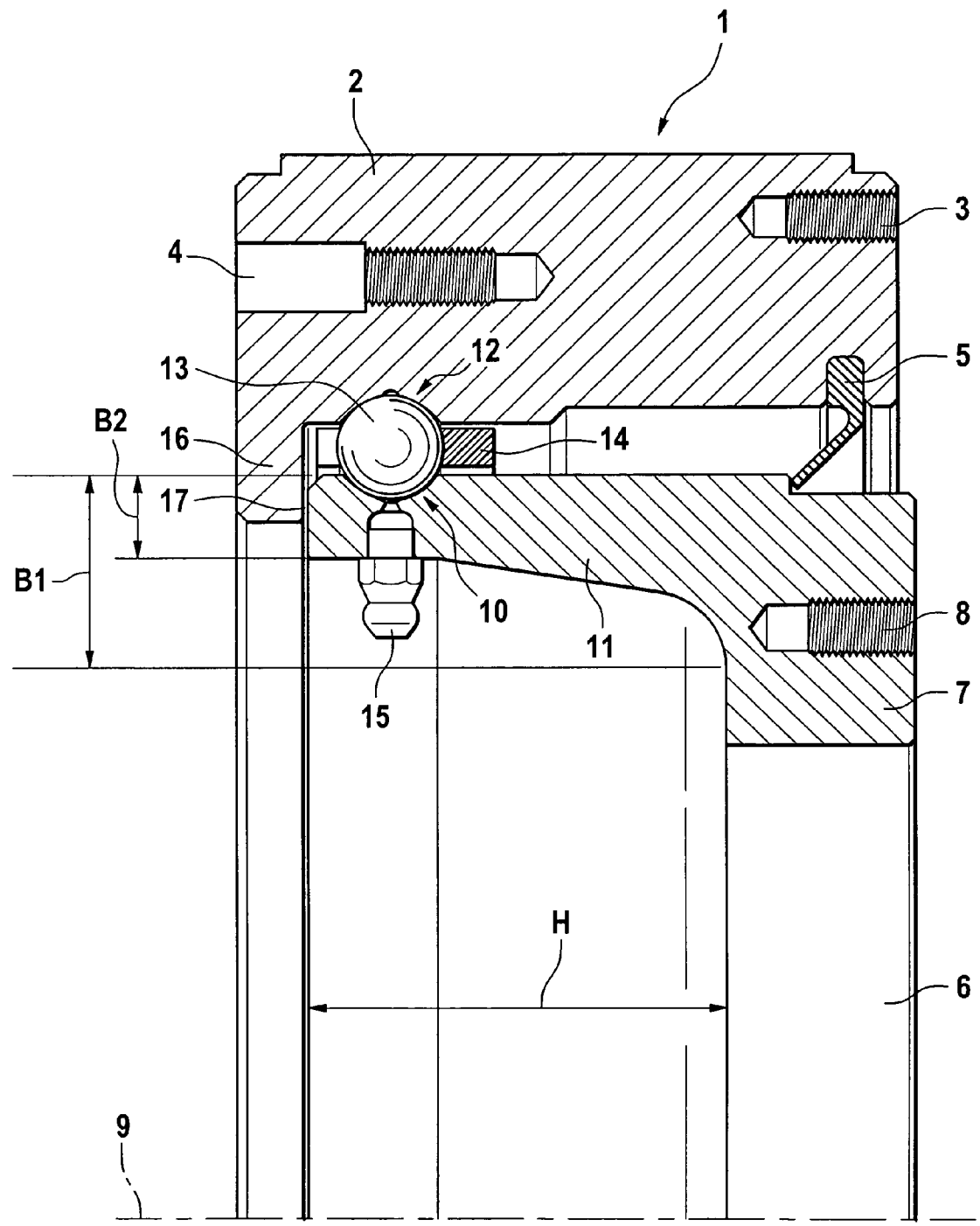
FIG. 1 shows a longitudinal section through a rolling bearing slewing connection configured according to the invention.

The rolling bearing slewing connection 1 shown in FIG. 1 comprises the outer race ring 2 that comprises fixing bores 3, 4 for connection to an adjacent structure, not illustrated. In the outer race ring 2 is arranged a seal 5 that, in this example of embodiment, is configured as a sliding seal whose sealing lips, not specifically identified in the figure, bear against the inner race ring 6. This race ring 6 is made in one piece and comprises the base part 7 that, for connection to a likewise not illustrated adjacent structure, comprises at least one fixing bore 8. The part 11 carrying the raceway 10 of the inner race ring 6 branches off the base part 7 to extend parallel to the bearing axis 9. The associated second raceway 12 is arranged on the outer race ring 2. Bearing balls 13 guided in a cage 14 are in rolling contact with the raceways 10, 12. The bearing balls 13 possess two points of contact, not referenced, with each of the outer race ring 2 and the inner race ring 6, i.e. the rolling bearing slewing connection 1 is configured as a four-point ball bearing. For improving the running behavior, a lubricating nipple 15 is arranged in the region of the raceway 10 of the inner race ring 6, so that lubricant can be conveyed in radial direction from the inside to the outside into the space lodging the bearing balls 13. At its left end in the figure, the outer race ring 2 comprises a radially inward extending projection 16 that partially overlaps the inner race ring 6. In this way, a radially extending gap 17 is formed between the two race rings 2, 6 that acts as a gap seal and seals the rolling bearing slewing connection 1.

As can be seen further in FIG. 1, the part 11 carrying the raceway 10 of the inner race ring 6 has a radial thickness, identified at B1, in the region in which it branches off the base part 7. This thickness diminishes continuously in axial direction till it comes to have a thickness dimension of B2 in the region of the raceway 10. In this example of embodiment, the geometrically measured ratio is given with B1:B2 is approximately 2.15:1. The conclusion to be drawn from this is with an augmenting ratio between B1 and B2 for a given constant axial length H, the pre-stress increases. As also perceptible, in this example of embodiment, the measured ratio of the axial length H of the part 11 carrying the raceway 10 to its radial thickness B1 is approximately 1:2.35. It is inferred from this that, due to the lever action, the pre-stress acting on the bearing balls 13 decreases with increasing axial length H.

Figure 2:
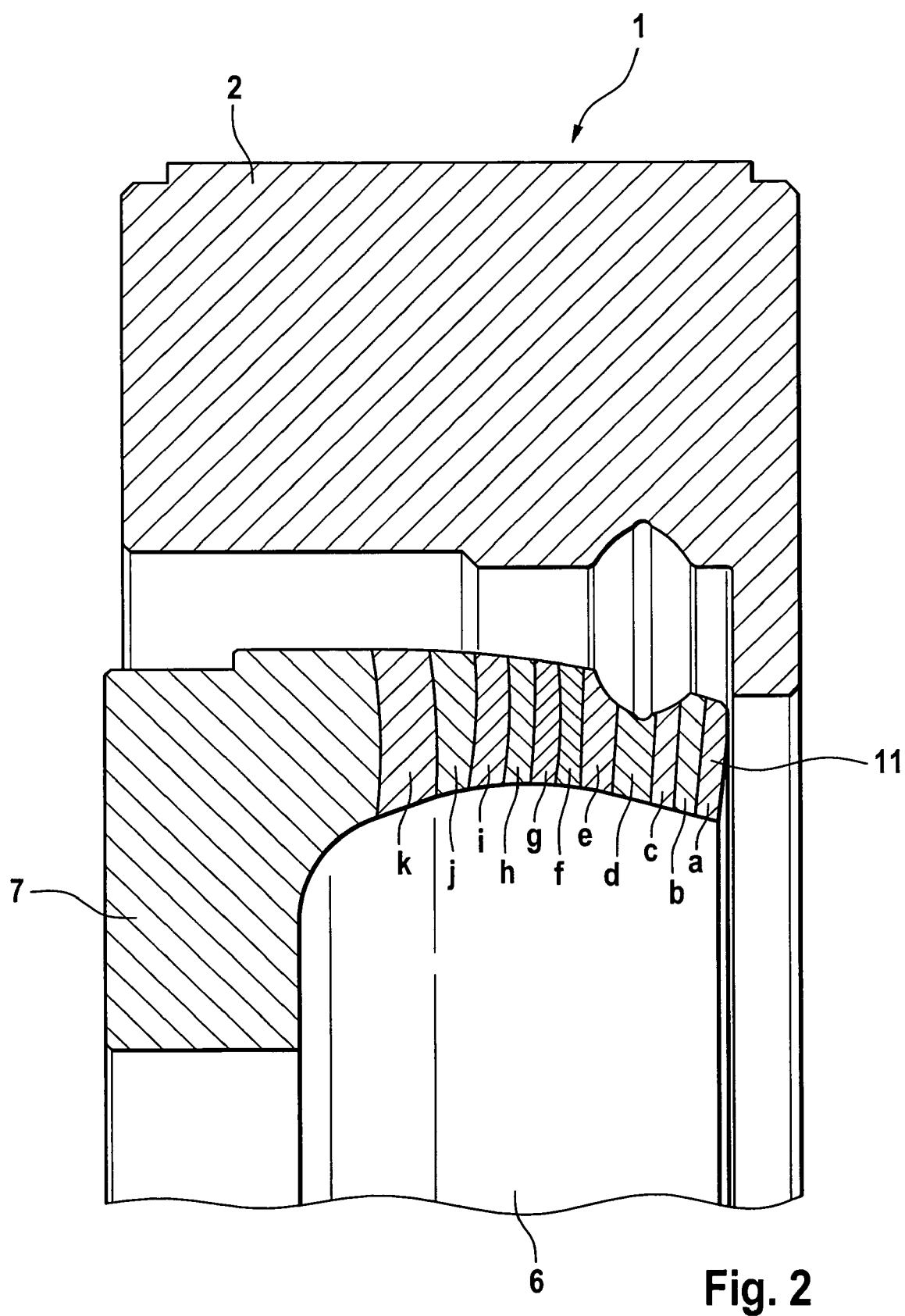
FIG. 2 shows regions of different elastic deformation in the part of the race ring carrying the raceway.

The different states of stress in individual portions illustrated in FIG. 2 and identified at a to k, show that, compared to an unstressed state, the largest elastic deformation of 5.67 μm is realized in the portion a. This deformation decreases continuously starting from the portion a that is furthest away from the base part 7 in axial direction. The portion k that is situated nearest to the base part 7 naturally has the smallest elastic deformation with a value of 0.89 μm. The respective states of stress and thus the respective elastic deformations are given in the following table:

| a | b | c | d | e | f | g | h | i | j | k |
|---|---|---|---|---|---|---|---|---|---|---|
| 5.67 μm | 5.19 μm | 4.71 μm | 4.24 μm | 3.76 μm | 3.28 μm | 2.81 μm | 2.32 μm | 1.85 μm | 1.37 μm | 0.89 μm |

Figure 3:
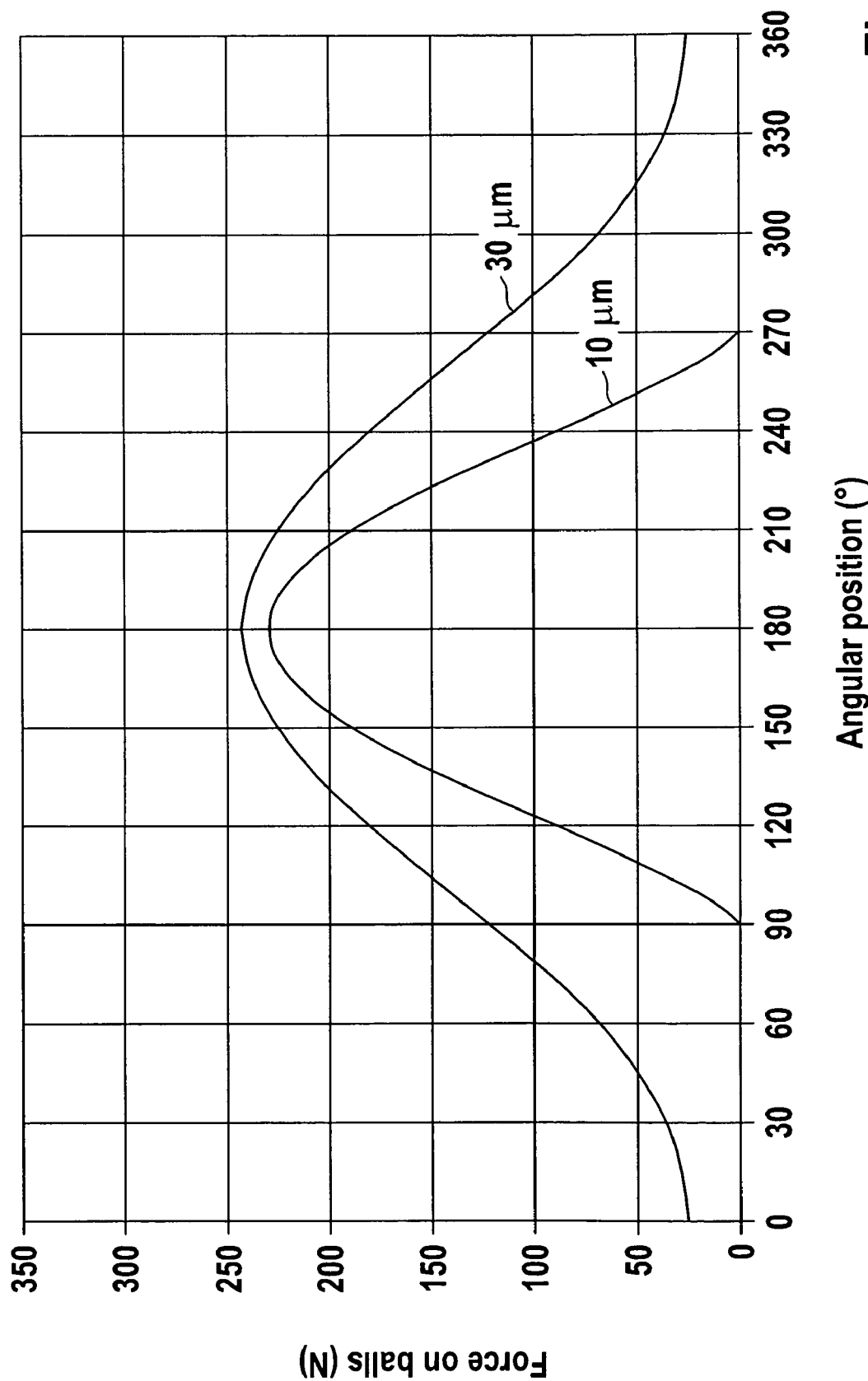
FIG. 3 illustrates the force acting on the bearing balls as a function of the angular position at different levels of pre-stress.

The following can be inferred from the graphical representation of FIG. 3 which shows the force acting on the bearing balls as a function of the respective angular position:

The lower curve representing a rolling bearing stewing connection under a pre-stress of 10 μm shows that during a complete rotation, the bearing balls are only pre-stressed in an angular range between 90° and 270°. During the other half of the rotation, no pre-stress exists, so that, upon load alternation, the bearing balls are subject to slippage that generates noise in the bearing. The upper curve for the same rolling bearing slewing connection under a pre-stress of 30 μm shows that, in this case, the bearing balls are pre-stressed over the entire angular range from 0° to 360°, so that no slippage can occur in the load alternation range.

The invention claimed is:

1. A rolling bearing slewing connection comprising two race rings arranged concentrically in each other, between which race rings a plurality of rolling elements roll on associated raceways, at least one of the race rings having an elastic flexible configuration, wherein the cross section of the flexible race ring having a one piece design with a first base part and a second part that branches off the base part in axial direction and carries the raceway, the radial thickness of the second part being smaller than the radial thickness of the base part and diminishes in direction of the raceway, the second part having a radial elastic deformability, in result of that the rolling elements having in the loaded state of rolling bearing slewing connection a pre-stressing in the entire angular range of 0° to 360° and roll on the raceway with no slippage.

2. A rolling bearing slewing connection according to claim 1, wherein a ratio between the radial thickness B1 of the part carrying the raceway in a region adjacent to the base part and the radial thickness B2 in a region of the raceway is B1:B2≧1, 5:1.

3. A rolling bearing slewing connection according to claim 1, wherein a ratio between the radial thickness B1 of the part carrying the raceway in a region adjacent to the base part and an axial length of the part carrying the raceway is B1:H≦1:2.

4. A rolling bearing slewing connection according to claim 1, wherein, for improving mechanical properties, the race rings are subjected to a hardening procedure.

5. A rolling bearing slewing connection according to claim 1, having a configuration as a four-point ball bearing.

6. A rolling bearing slewing connection according to claim 1, wherein the ratio of a pitch circle diameter to a diameter of each individual rolling element is larger than 30:1.

7. A rolling bearing slewing connection according to claim 1, wherein the rolling elements are made of a ceramic material.

* * * * *